June 25, 1968  KAZUYUKI MORIHARA  3,390,054

PROCESS FOR PREPARING PROTEINASES

Filed Dec. 6, 1965

INVENTOR
Kazuyuki Morihara
BY Wenderoth, Lind
and Ponack. Attorneys 3,390,054
PROCESS FOR PREPARING PROTEINASES
Kazuyuki Morihara, Osaka Prefecture, Japan, assignor to
   Shionogi & Co., Ltd., Osaka, Japan
Filed Dec. 6, 1965, Ser. No. 511,803
Claims priority, application Japan, Dec. 16, 1964,
   39/71,200; Mar. 20, 1965, 40/16,391
7 Claims. (Cl. 195—66)

ABSTRACT OF THE DISCLOSURE

Proteinase is prepared by inoculating a nutrient medium which contains, as sole carbon source, a non-carbohydrate (e.g. heavy mineral oil or aliphatic polyhydric alcohol), with a strain of Pseudomonas aeruginosa, culturing and recovering accumulated proteinase from the culture broth.

---

Figure 1:
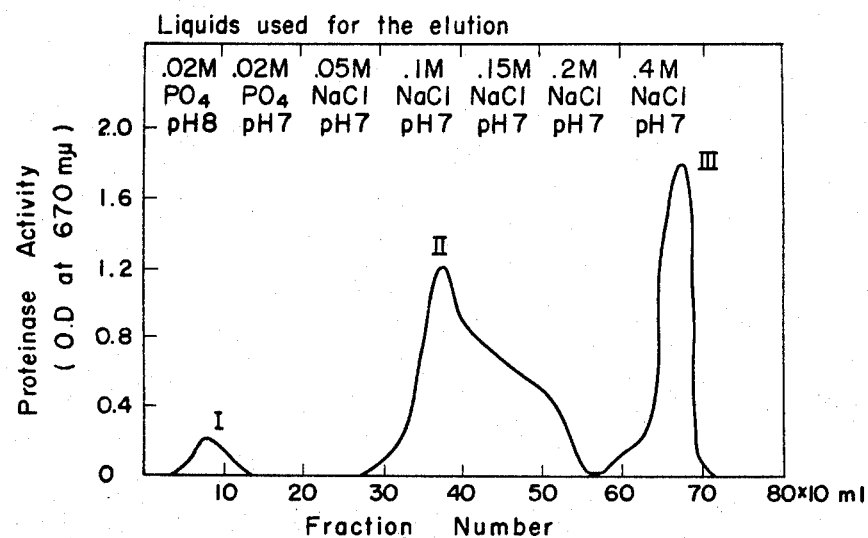

The present invention relates to a process for preparing proteinases, and more particularly the invention relates to a novel process for preparing proteinase by inoculating a strain of Pseudomonas aeruginosa in a medium which comprises non-carbohydrate carbon sources together with suitable nitrogen sources and inorganic salts, and recovering accumulated proteinase from the cultured broth after some incubation period.

There has heretofore primarily been employed a highly concentrated solution of carbohydrate, for example, a glucose solution of high concentration, for high potential production of proteinase by cultivation of a strain of Pseudomonas aeruginosa on a medium comprising non-believed that the incorporation of some kind of carbohydrate in the culture medium is indispensable. This has rendered the prior processes unduly expensive, since carbohydrates are inherently expensive and limited in view of their nature as natural resource.

The disadvantage of the prior procedure is obviated by the present invention, according to which proteinase can be produced and accumulated favorably in a culture broth comprising a component derived from petroleum resources as sole carbon source, by the culturing in such broth of an inoculated strain of Pseudomonas aeruginosa. Furthermore, according to this invention, aliphatic polyhydric alcohols which are available as secondary products of petroleum gas production can be utilized in culture media as suitable carbon sources and the proteinases obtained with such media show approximately twice as much enzymatic activity as those obtained by utilizing carbohydrates.

The present invention thus, briefly stated, is a process for preparing proteinase which comprises inoculating Pseudomonas aeruginosa on a medium comprising non-saccharide carbon sources, accumulating proteinase in said medium and extracting said proteinase from said medium.

The primary object of the present invention is to provide a process for preparing proteinases by the cultivation of strains of Pseudomonas aeruginosa on a medium comprising non-carbohydrate carbon nutrient as its sole carbon source. Another object of the present invention is to provide a process for preparing proteinases by the cultivation of strains of Pseudomonas aeruginosa on a medium comprising crude petroleum oil or a fraction thereof as carbon source. Still another object of the invention is to provide a process for preparing proteinases by the cultivation of strains of Pseudomonas aeruginosa on a medium comprising polyhydric alcohols which are secondary products of petroleum gas production as carbon source. A further object of the present invention is to provide a process for preparing proteinase by the cultivation of strains of Pseudomonas aeruginosa on a medium which additionally comprises yeast extract as its nitrogen source. A still further object of the invention is to provide a process for preparing proteinase which has an elastolytic activity besides its proteolytic activity.

Other objects and attendant advantages of the present invention will be apparent to those skilled in the art from the following disclosure and the appended claims.

For the carbon sources employed for the process of the present invention, various kinds of hydrocarbons and polyhydric alcohols can be utilized depending on the nature of the strain and the cultivation conditions employed. For the purpose of illustration, the following detailed description is based on typical culture broth compositions and a strain of Pseudomonas aeruginosa which has been supplied by the Institute for Fermentation, Osaka, and which bears accession number IFO 3455.

Two kinds of culture broth have been illustratively employed; medium A has been used to illustrate the growth vs. the variance of the carbon source that is derived from petroleum resources and medium B has been used to illustrate the growth vs. that of the carbon source that is derived from petroleum gas production as a secondary product, glycerol being appended for the purpose of comparison.

MEDIUM A

| Carbon source derived from petroleum: | Various concentrations, percent |
|---|---|
| Diammonium hydrogen phosphate | [1]0.5 |
| Potassium dibasic phosphate | 0.25 |
| Magnesium sulfate (7H$_2$O) | 0.1 |
| Calcium carbonate | [2]0.2~0.7 |
| Tween 20[3] | 0.05 |
| Tap water | Balance |

[1] Percentages in Mediums A and B are by weight.
[2] Will vary as 0.2%, 0.3%, 0.5% and 0.7% respectively for the heavy oil concentrations of 1%, 3%, 7% and 10%.
[3] Surfactant.

MEDIUM B

| Carbon source derived from petroleum gas: | Various concentrations, percent |
|---|---|
| Ammonium nitrate | 0.5 |
| Potassium monobasic phosphate | 0.2 |
| Potassium dibasic phosphate | 0.1 |
| Magnesium sulfate (7H$_2$O) | 0.1 |
| Manganese chloride (4H$_2$O) | 0.04 |
| Ferric sulfate | 0.01 |
| Calcium chloride | 0.01 |
| Distilled water | Balance |

NOTE.—Calcium carbonate is added in amount as much as 0.3%, 0.5%, 0.7% and 1.0% respectively for the respective glycerol concentrations of 1%, 3%, 5% and 7%.

Using shaking flask of 500 ml. capacity, the afore-mentioned strain is inoculated on 100 ml. of the medium A and B with various concentration of carbon source and submerged for 5–10 days at 27° C. to obtain the following results.

TABLE I

| Carbon sources | Concentration (percent by weight) | Growth | [PU]/ml. ×10⁻³ |
|---|---|---|---|
| Heavy petroleum oil | 1 | + | 0.3 |
|  | 3 | ++ | 0.6 |
|  | 7 | ++++ | 1.5 |
|  | 10 | ++++ | 1.6 |
| Kerosene | 7 | ++ | 0.5 |
| Gasoline | 7 | − | 0.0 |
| Methanol | 1 | ± | 0.1 |
|  | 3 | − | 0.0 |
| Ethanol | 1 | + | 0.3 |
|  | 3 | ++ | 1.0 |
| n-Propanol | 1 | ± | 0.1 |
| Isopropanol | 1 | − | 0.0 |
| N-butanol | 1 | − | 0.0 |
| Ethyleneglycol | 1 | ± | 0.2 |
|  | 3 | − | 0.0 |
|  | 7 | − | 0.0 |
|  | 10 | − | 0.0 |
| Propyleneglycol | 1 | + | 0.6 |
|  | 3 | + | 0.8 |
|  | 7 | − | 0.0 |
|  | 10 | − | 0.0 |
| Glycerol | 1 | ++ | 0.8 |
|  | 3 | +++ | 2.0 |
|  | 5 | +++ | 2.8 |
|  | 10 | ++ | 1.2 |

NOTE.—Proteolytic activity was determined using casein as substrate by the method described previously (K. Morihara, J. Bacteriol., 88, 745 (1964), in which the specific activity ([PU]) is expressed as milligrams of tyrosine released per minute.

As is shown by the above table, the maximum proteinase production obtained by the strain with the medium containing petroleum carbon source is at 7–10% concentration and results in approximately $$1.5–1.6 \times 10^{-3} [PU]/ml.$$

and the maximum production obtained with polyhydric alcohols is glycerol 3%–5% concentration which results in $2.8 \times 10^{-3} [PU]/ml.$ In the case of heavy petroleum oil, the amount of proteinase production and the concentration of the hydrocarbon in the broth are in a linear relationship whereas in case of polyhydric alcohols there is no such relationship. In addition, the growth of bacterium cell and the rise in the proteinase unit of the product are not necessarily in a proportional relationship.

From the standpoint of economical and industrial usefulness, it is rather practical to utilize heavy petroleum oil and propyleneglycol in spite of the fact that the latter shows a rather poor result in the above table. However, this can be compensated for by the addition of yeast extract as nitrogen nutrient, as shown in the following table:

TABLE 2

| Medium | Yeast extract (percent by weight) | [PU]/ml. ×10⁻³ |
|---|---|---|
| Medium A containing 10% of heavy petroleum oil | 0 | 1.6 |
|  | 0.3 | 2.2 |
|  | 0.5 | 2.8 |
|  | 1.0 | 3.9 |
|  | 2.0 | 4.0 |
| Medium B containing 3% of propyleneglycol | 0 | 0.8 |
|  | 0.2 | 5.5 |
|  | 1 | 8.0 |
| Medium B containing 5% of propyleneglycol | 0 | 0 |
|  | 0.2 | 9.0 |
|  | 1 | 16.0 |
| Medium B containing 7% of propyleneglycol | 0 | 0 |
|  | 0.2 | 2.0 |
|  | 1 | 11.0 |

The general procedure of preparing proteinases and the physico-chemical properties of the end products of the present invention will be summarized in the following.

For the starting materials of the present invention, high boiling point fractions of petroleum hydrocarbons and polyhydric alcohols of petroleum origin are the most preferable, although other hydrocarbons and polyhydric alcohols can be utilized.

Although yeast extract has been particularly dealt with as nitrogen source and nitrogen containing nutrient, various other ammonium salts of organic and inorganic origin, that is, for instance, ammonuim sulphates, peptone, meat extracts, yeast extract, corn steep liquor, hydrolyzates of casein and the like, can also conveniently be used. Further, suitable phosphates, salts of magnesium, calcium and strontium can be incorporated in the broth.

These materials can be suitably selected and combined for the medium depending on the nature of the strains employed and the conditions used for the incubation of the strain.

A liquid type medium will be advantageously employed in a stationary culture and tank submersion with or without agitation and/or bubbling. However, tank submersion is especially preferable for mass treatment.

The cultivation will preferably be carried out at 30–40° C. in an aerated or agitated condition. The submersion period can be shortened with rise in the culture broth temperature; thus, for instance, an optimum result, i.e. a maximum enzymatic factor will either be attained in a submerging period of five days at 30° C. or in a period of fewer (2–3) days at 37–40° C.

For the extraction of proteinase from the culture broth, any per se conventional refining means can be employed; that is, the proteinase can be obtained in crystalline form by operations such as salting out with ammonium sulphate, acrinol precipitation, fractional sedimentation as well as column chromatography with cation exchange resin or DEAE-cellulose etc.

For example, three species of proteinase as illustrated in FIG. 1 can be isolated by per se known fractional column chromatography utilizing DEAE cellulose from centrifuged supernatant salted out with ammonium sulphate and containing proteinases which have been formed by five days' submersion of Pseudomonas aeruginosa in a culture medium containing hydrocarbons originated from petroleum or polyhydric alcohols originated from petroleum gas, as carbon source.

After dialyzing against water followed by freeze drying, the various resultant proteinase fractions I, II and III are obtained.

Figure 2:
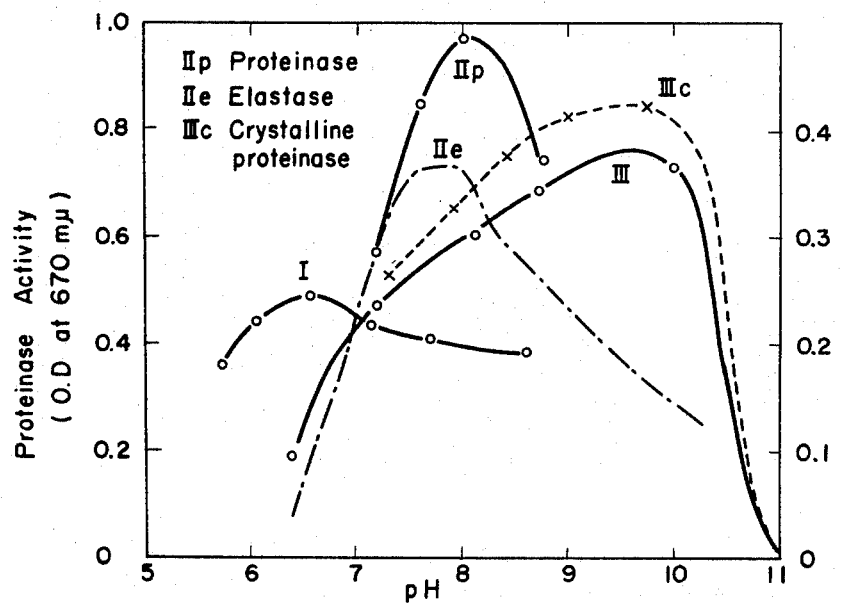

FIG. 2 shows the observed effect of pH values for enzymatic activity, in which the optimal pH values for the fractions I, II and III are found as 6.5, 7.8 and 9.5; therefore, they are regarded as neutral, weak basic and basic proteinase respectively. The data given in Table 3 express the protein decomposing ability of these three proteinases versus the properties of the substrates employed and prove the differences in specificities of these three proteinases. Moreover, fraction II has elastolytic activity besides proteolytic activity. Fraction III has a specificity which is quite similar to that of known crystalline proteinase, and a further study of the physicochemical properties of the crystalline enzyme establishes that fraction III is entirely the same as the known proteinase described in British patent specification No. 967,848.

TABLE 3.—ENZYMATIC ACTIVITIES OF THESE PROTEINASES

| Fr. | Enzyme | | |
|---|---|---|---|
|  | Proteinase | | Elastase |
|  | [PU] Gel[1] | [PU] Cas[2] | [EU][3] |
| I | 70 | 1.8 | 0 |
| II | 200 | 13.8 | 35.7 |
| III | 220 | 2.15 | 0 |

[1] Morihara's Method (Gelatin Liquefaction, K. Morihara, Bull. Agr. Chem. Soc., Japan, 20, 243–251 (1956).
[2] Morihara's Method (Casein digestion, K. Morihara, J. Bacteriol., 88, 745 (1964).
[3] Sachar's Method (L. A. Sachar et al. Proc. Soc. Exp. Biol. Med. 90, 323 (1955)) with orcein elastin 20 mg in 0.1 mol Tris buffer (pH 7.5) 1 ml. for enzyme solution 1 ml. and water 1 ml., shaked for 3 hours at 40° C. [EU], Elastase Unit, is defined as milligrams of dissolved elastin per milligrams of enzyme used.

The following tables show the differences in stability (Table 4) and in behavior against chelating agents (Table 5) of these proteinases.

TABLE 4.—STABILITIES OF THESE THREE PROTEINASES
[Measured as percent of retained activity]

| Fr. | Enzymatic Activity | pH values of environment [1] | | | | | | Temperature, °C. [2] | | | | | |
|---|---|---|---|---|---|---|---|---|---|---|---|---|---|
| | | 3 | 4 | 5 | 6 | 8 | 10 | 11 | 50° | 55° | 60° | 65° | 70° | 75° |
| I | Proteinase | 0 | 90 | 100 | 100 | 100 | 88 | 0 | 100 | 96 | 63 | 0 | | |
| II | Proteinase | 0 | 0 | 30 | 100 | 100 | 76 | 0 | 100 | 90 | 89 | 80 | 41 | 0 |
| | Elastase | 0 | 0 | 33 | 100 | 100 | 76 | 0 | 100 | 90 | 86 | 71 | 40 | 0 |
| III | Proteinase | 0 | 87 | 100 | 100 | 100 | 93 | 0 | 100 | 94 | 85 | 0 | | |

[1] Against pH values of environment (Concentration of enzyme: 0.01% after being allowed to stand overnight at room temperature).
[2] Against Temperature (Concentration of enzyme: 0.01% for 10 minutes at pH 7.5).

TABLE 5.—EFFECTS OF CHELATING AGENT AGAINST THESE THREE PROTEINASE
[Concentrations of enzyme: 0.01% for 30 minutes at 40° C.]

| Chelating | Measured as percent of retained activity | | | |
|---|---|---|---|---|
| | Proteinase | Proteinase | Elastase | Proteinase |
| EDTA: | | | | |
| $10^{-2}$ mol, pH 7 | 100 | 7 | 5 | 0 |
| $10^{-3}$ mol, pH 7 | 100 | 7 | 0 | 70 |
| $10^{-3}$ mol, pH 6 | 100 | 0 | 0 | 0 |
| $10^{-4}$ mol, pH 7 | | 56 | 8 | 90 |
| $10^{-4}$ mol, pH 6 | | | 0 | 10 |
| o-Phenanthreolin: | | | | |
| $10^{-3}$ mol, pH 7 | 100 | 5 | 0 | 20 |

These deactivated enzymes can be reactivated again by dialysis against water.

Furthermore, these three proteinases will not be affected by inhibitors such as diisopropyl phosphofluoridate ($10^{-3}$ mol) hydrogen cyanide ($10^{-3}$ mol), thioglycolic acid ($10^{-3}$ mol), p-chloromercury benzoate ($10^{-3}$ mol), and by these inhibitors extracted from soybean or potato.

The elastolytic activity of fraction II which goes along with its proteolytic activity cannot be separated from the latter by fractionation with DEAE cellulose; further the optimal pH values for the stabilities of and the behaviors to chelating agents of the two activities are identical. Proteinase is recoverable in needle-like crystalline form from fraction II by introducing ammonium sulfate. Since it has been confirmed that fraction II is a single substance, by means of ultra-centrifuge and electrophoresis in spite of the fact that it has an elastolytic activity together with proteolytic activity, it has been concluded that the two activities are ascribed to the same enzyme protein.

The physico-chemical properties of the crystalline enzyme isolated from fractions II and III which are end products of the present invention are summarized in the following table, fraction I being omitted from the table because only qualitative and not reliable quantiative results could be obtained therewith.

TABLE 6.—PHYSICO-CHEMICAL PROPERTIES OF THE CRYSTALLINE ENZYMES

| | Fr. II | Fr. III |
|---|---|---|
| Sedimentation constant, $S_{20 \cdot w}$ | 3.38S | 3.99S |
| Diffusion constant, $D_{20 \cdot w}$ ($10^{-7}$ cm.-sec.$^{-1}$) | 7.58 | 7.4 |
| Specific volume, cm.$^3$-gm.$^{-1}$ | 0.72 | 0.73 |
| Molecular weight | 39,500 | 48,400 |
| Adsorption in ultraviolet region (at 280 mμ $E^{1\%}_{1\,cm.}$) | [1] 14.52 | [2] 16.0 |
| Isoelectric point | 5.0 | 4 |
| Semi-Cystine | 5 | 0 |
| Solubility | [3] | [4] |

[1] pH 10 glycinate buffer (Miller-Golder's buffer).
[2] Water.
[3] Sparingly soluble.
[4] Readily soluble.

Presently preferred embodiments of the invention are set forth as follows, solely for the purpose of illustration. Percentages therein are by weight.

Example 1

*Pseudomonas aeruginosa* (IFO No. 3455 strain) is inoculated on an aqueous medium comprising 10% of heavy petroleum oil, 1% of diammonium hydrogen phosphate, 1% of disodium hydrogen phosphate, 0.2% of potassium phosphate, 0.1% of magnesium sulfate ($7H_2O$), 1% of yeast extract, 0.7% of calcium carbonate and 0.05% of surfactant (Tween 20) and being adjusted to pH 7. Aerated cultivation with agitation is then carried out for five days at 37° C. An activity of $4 \times 10^{-3}$ [PU]/ml. is obtained. Thus obtained crude broth is salted out by the introduction of saturated aqueous solution of ammonium sulphate. Then the supernatant of said liquor is dialyzed against a buffer solution of 0.02 molar phosphoric acid (pH 8) and is applied to a DEAE cellulose column which has previously been treated with 2 liters of said buffer. The said column is subsequently eluted with 2 liters of said buffer, 2 liters of 0.1 molar sodium chloride solution (adjusted with 0.02 molar phosphoric acid buffer, pH 7.0) and 2 liters of 0.3 molar sodium chloride solution (adjusted with 0.02 molar phosphoric acid buffer, pH 7.0) to afford the eluates of three different fractions I, II and III in succession. The inclusive yield of this column chromatography is 90% and the elution gives the fractions I, II and III in 6, 68 and 26% yield respectively. After refrigeration needle crystals are formed from the water-diluted eluate of fraction II by concentrating below 40° C. followed by salting out with ammonium sulphate solution to such an extent that the eluate is slightly clouded. Fraction III is recovered from the eluate by the following procedure, that is the eluate containing fraction III is dialyzed against water and to this, 1% acrinol is added so as to make the concentration to 0.07%. The precipitate is collected by centrifugation, rinsed with water and extracted with 0.5 molar calcium chloride solution. The extract is then treated with 0.5 to 2 volumes of acetone in a refrigerator (at a temperature lower than 5° C.) to fractionally precipitate crude enzyme. The precipitated crude enzyme is dissolved in 0.01 molar calcium chloride solution so that the concentration of protein is as high as possible. After removal of insoluble substances, acetone is introduced dropwise into the suspension while stirring, until a slight turbidity appears. After being allowed to stand overnight in a refrigerator, more acetone is added dropwise to the supernatant whereby needle crystals of Fraction III separate.

The physico-chemical properties of these crystalline enzymes are as aforementioned in Tables 3–6.

Example 2

*Pseudomonas aeruginosa* (IFO No. 3455 strain) is inoculated on an aqueous medium comprising 5% of propyleneglycol, 1% of secondary ammonium phosphate, 0.2% of potassium phosphate, 0.05% of magnesium sulphate, 0.5% of calcium carbonate and 1% of yeast extract and being adjusted to pH 7. Aerated cultivation with agitation is then carried out for five days at 37° C. and an enzymatic activity of $16.0 \times 10^{-3}$ [PU]/ml. is obtained.

Fractionation is carried out according to the procedure of Example 1.

What is claimed is:

1. A process for preparing proteinase which comprises cultivating *Pseudomonas aeruginosa* under aerobic conditions in a synthetic culture medium containing, as its sole carbon nutrient, non-carbohydrate selected from the group consisting of heavy mineral oil and aliphatic polyhydric alcohols, and thereafter separating the accumulated proteinase from the nutrient medium.

2. A process as claimed in claim 1, wherein said non-carbohydrate nutrient is heavy mineral oil.

3. A process as claimed in claim 1, wherein said non-carbohydrate carbon nutrient is aliphatic polyhydric alcohol.

4. A process as claimed in claim 2 wherein said synthetic culture medium contains nitrogen nutrient.

5. A process as claimed in claim 3 wherein said synthetic culture medium contains nitrogen nutrient.

6. A process as claimed in claim 4, in which said nitrogen nutrient is yeast extract.

7. A process as claimed in claim 5, in which said nitrogen nutrient is yeast extract.

References Cited

UNITED STATES PATENTS

| | | | |
|---|---|---|---|
| 3,222,258 | 12/1965 | Iizuka et al. | 195—29 |
| 3,234,105 | 2/1966 | Motizuki et al. | 195—49 |
| 3,271,266 | 9/1966 | Laine et al. | 195—3 |

LIONEL M. SHAPIRO, *Primary Examiner.*